(12) United States Patent
Kasper et al.

(10) Patent No.: US 9,141,407 B2
(45) Date of Patent: Sep. 22, 2015

(54) SYSTEM AND APPROACH FOR DEFINING LABELS FOR ENUMERATION VALUES OF PARAMETERS IN A WALL MODULE

(71) Applicant: Honeywell International Inc., Morristown, NJ (US)

(72) Inventors: Gary Kasper, Champlin, MN (US); Paul Wacker, Plymouth, MN (US); Paul Grinberg, Minneapolis, MN (US); William Bray, Minneapolis, MN (US); Aaron D'Souza, Morristown, NJ (US)

(73) Assignee: Honeywell International Inc., Morristown, NJ (US)

( * ) Notice: Subject to any disclaimer, the term of this patent is extended or adjusted under 35 U.S.C. 154(b) by 391 days.

(21) Appl. No.: 13/677,145

(22) Filed: Nov. 14, 2012

(65) Prior Publication Data

US 2014/0137022 A1 May 15, 2014

(51) Int. Cl.
G06F 9/44 (2006.01)
(52) U.S. Cl.
CPC ............... *G06F 9/4443* (2013.01); *G06F 8/38* (2013.01)
(58) Field of Classification Search
None
See application file for complete search history.

(56) References Cited

U.S. PATENT DOCUMENTS

| | | | |
|---|---|---|---|
| 7,653,459 B2 | 1/2010 | Pouchak et al. | |
| 7,738,972 B2 | 6/2010 | Pouchak | |
| 7,826,929 B2 | 11/2010 | Wacker | |
| 7,966,348 B2 | 6/2011 | Chen et al. | |
| 8,027,273 B2 * | 9/2011 | Nguyen | 370/254 |
| 8,112,162 B2 | 2/2012 | Pouchak et al. | |
| 8,239,500 B2 | 8/2012 | Pouchak | |
| 8,464,168 B2 * | 6/2013 | Bump et al. | 715/762 |
| 8,688,448 B2 * | 4/2014 | Peters et al. | 704/236 |
| 8,863,018 B2 * | 10/2014 | Taylor et al. | 715/771 |
| 2008/0004725 A1 | 1/2008 | Wacker | |
| 2008/0010049 A1 | 1/2008 | Pouchak et al. | |
| 2009/0113037 A1 | 4/2009 | Pouchak | |
| 2009/0118845 A1 * | 5/2009 | Eldridge et al. | 700/86 |
| 2009/0158188 A1 * | 6/2009 | Bray et al. | 715/771 |
| 2009/0271365 A1 * | 10/2009 | Chen et al. | 707/3 |
| 2010/0100829 A1 * | 4/2010 | Laberge et al. | 715/762 |
| 2010/0162111 A1 * | 6/2010 | Amundson et al. | 715/702 |
| 2010/0274366 A1 * | 10/2010 | Fata et al. | 700/7 |
| 2012/0191690 A1 * | 7/2012 | George | 707/708 |
| 2012/0221149 A1 | 8/2012 | Kasper | |
| 2012/0272146 A1 | 10/2012 | D'Souza et al. | |

OTHER PUBLICATIONS

Bray et al., "Schedule Some Time with Zio Plus," 12 pages, May 23, 2011.
Copy of U.S. Appl. No. 13/415,765, filed Mar. 8, 2012.

\* cited by examiner

*Primary Examiner* — Matt Kim
*Assistant Examiner* — Maryam Ipakchi
(74) *Attorney, Agent, or Firm* — Seager Tufte & Wickhem LLC.

(57) ABSTRACT

A system and approach for defining labels for values, such as ordinal numbers, of enumerated parameters in a wall module. Label and number pairs may be downloaded to a wall module as part of definitions of the parameters. The wall module may be a source of a list of labels to a user and then set each parameter to a value associated with a label selected by the user.

21 Claims, 18 Drawing Sheets

| OCCUPANCY | | | |
|---|---|---|---|
| TEXT LABEL | GRAPHIC SYMBOL OR LABEL (USA) | NUMBER |
| OCC | (person icon) | 0 |
| UNOCC | (empty icon) | 1 |
| STANDBY | STANDBY | 3 |

| FAN | | | |
|---|---|---|---|
| TEXT LABEL | GRAPHIC SYMBOL OR LABEL | NUMBER |
| OFF | ✺OFF | 0 |
| ON | ✺ON | 1 |
| AUTO | ✺AUTO | 2 |
| SPEED 1 | ✺ ▫ | 3 |
| SPEED 2 | ✺ ▫ ▪ | 4 |
| SPEED 3 | ✺ ▪ ▪ ▪ | 5 |

SYSTEM AND APPROACH FOR DEFINING LABELS FOR ENUMERATION VALUES OF PARAMETERS IN A WALL MODULE

BACKGROUND

The present disclosure pertains to wall modules for HVAC systems and particularly to indications for various parameters on displays of wall modules.

SUMMARY

The disclosure reveals a field configurable system and approach for defining labels for values, such as ordinal numbers, of enumerated parameters in a wall module. Label and number pairs may be downloaded to a wall module as part of definitions of the parameters. The wall module may be a source of a list of labels to a user and then set each parameter to a value associated with a label selected by the user.

BRIEF DESCRIPTION OF THE DRAWING

FIG. 17 is a diagram of the text label, graphic symbol or label, and number for occupancy of a building for a screen on a wall module display; and FIG. 18 is a diagram of the text label, graphic symbol or label, and number for fan status of a building HVAC for a screen on a wall module display.

DESCRIPTION

A programmable wall module (e.g., a Zio™ by Honeywell International Inc. which may be referred herein as to a wall module) may allow a user to define specific numeric values (i.e., enumerations) that can be selected for a parameter. The meanings for these values need to be defined for an end-user in some other way, such as in a document. A customer would like an ability to define text-based labels for each enumeration value so that it is easier to view and set the parameter value. The system and approach for defining labels for enumeration values of parameters in a wall module may be a part of, integrated with and/or support a heating, ventilation and air conditioning (HVAC) system and approach.

The present approach may resolve the issue by allowing the user to define labels in the programming tool for each value supported in an enumerated parameter. These label/number pairs may be downloaded to the wall module as part of a definition of the parameter. The wall module may then present a list of labels to the user, and then set the parameter to a value associated with the label selected by the user.

The programming tool may allow the user to define the number/label pairs that are permitted for the enumerated parameter. These pairs may be encoded and downloaded into the wall module as part of the associated parameter. If the same enumeration is used in multiple parameters, then the same enumeration may be referenced by each parameter to save resources in the wall module. When the value of an enumerated parameter is set, the wall module may then present the list of labels associated with that parameter to the user. When the user selects a label, the value associated with that label may be assigned to the parameter.

The LCD wall module may be compatible via a two-wire, polarity insensitive bus with Spyder™ Sylk™ enhanced controllers. The two-wire, polarity insensitive bus may simplify wiring and free up inputs and outputs. The wall module may have the ability to change and view controller variables directly. The display of the wall module may be customizable. A powerful configuration wizard may be on WEB-Pro-AX™ software that runs on a PC or a JACE™ (Java Application Control Engine) controller. It may let one create parameters and organize them under category names. One may access and change almost any point in the controller including scheduling and balancing. (Spyder™, Sylk™ and WEB-Pro-AX™ are trademarks of Honeywell International Inc., and JACE™ is a trademark of Iridium, Inc.)

The present system and approach, as described herein and/or shown in the Figures, may incorporate one or more processors, computers, controllers, user interfaces, wireless and/or wire connections, and/or the like, wherever desired.

Figure 1:
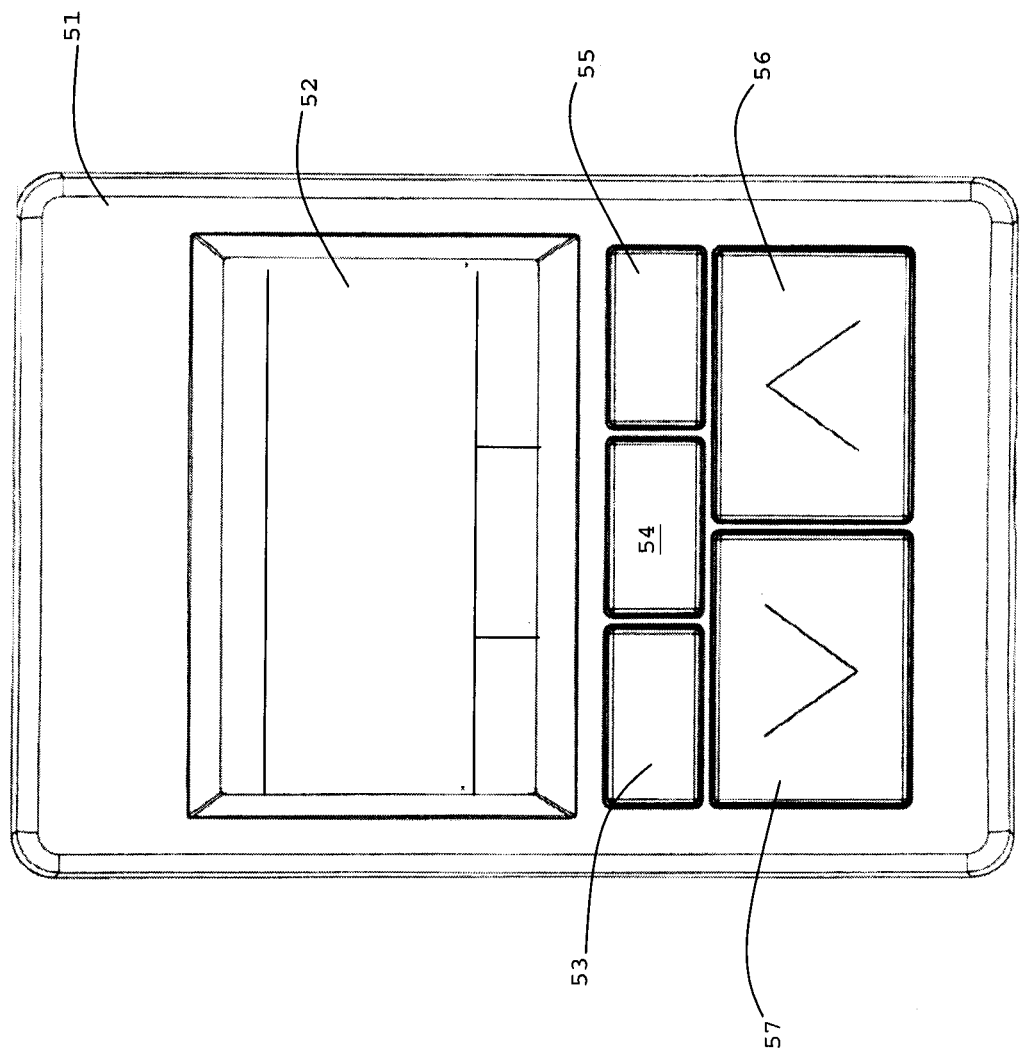
FIG. 1 is a diagram of a screen print of a bus wall module.
Figure 2:
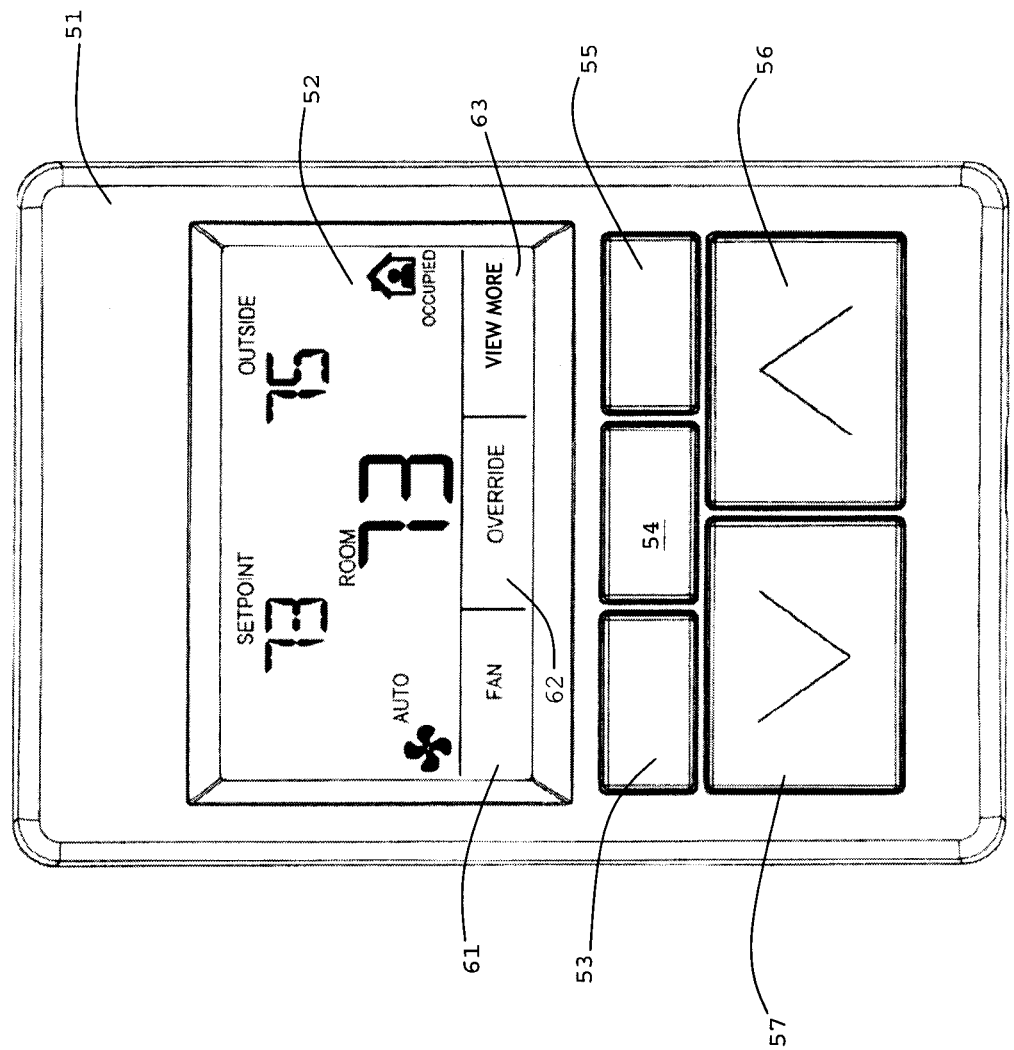
FIG. 2 is a diagram of a wall module having a home screen.
Figure 3:
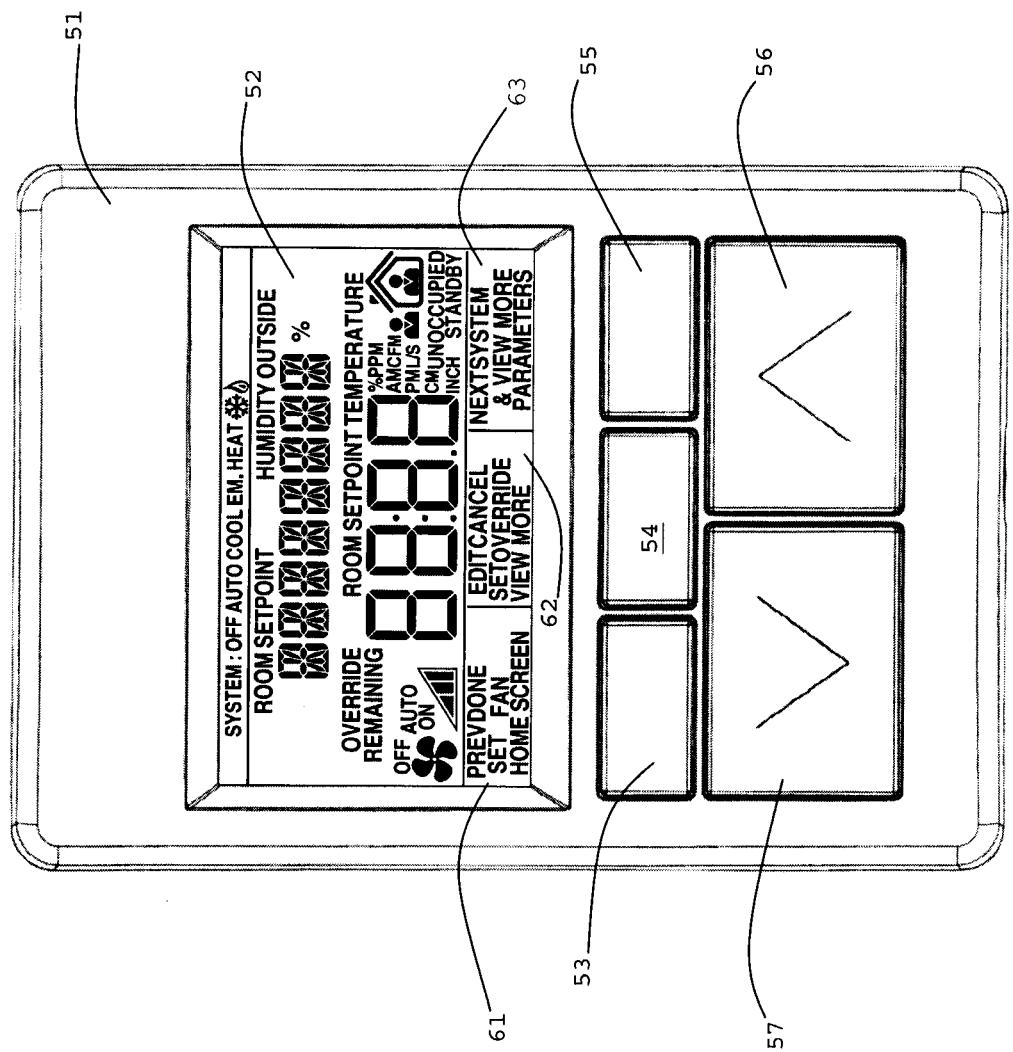
FIG. 3 is a diagram of a bus wall module showing virtually all of the segment mapping.

FIG. 1 is a diagram of a wall module 51 having a display 52. Module 51 may have softkeys 53, 54 and 55 and up and down value or numeric changing keys 56 and 57, respectively. FIG. 2 is another diagram of module 51 showing an example of a home screen on display 52. Areas 61, 62 and 63 may reveal indications of what happens if corresponding softkeys 53, 54 and 55, respectively, are pressed. FIG. 3 is a diagram of segment mapping on an LCD glass of display 52.

Figure 4:
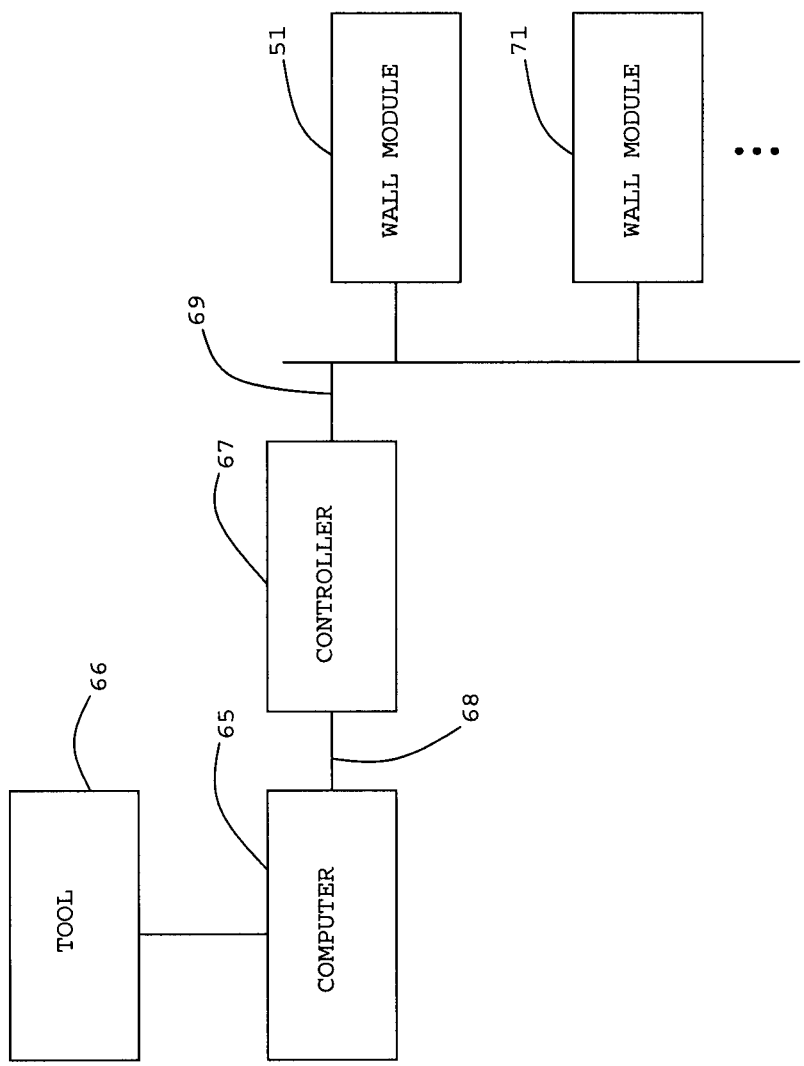
FIG. 4 is a diagram of an example layout of wall module connected to a computer via a controller.

FIG. 4 is a diagram of an example layout of wall module 51 connected to a computer 65 via a controller 67. Module 51 may alternatively be connected directly to computer, 65 particularly for testing. Computer 65 may be a PC or another controller such as a supervisory controller, or an interface between tool 66 and controller 67. A programming tool 66 may be connected to computer 65. Tool 66 may provide a field configurable system and approach for defining labels for values, such as ordinal numbers, of enumerated parameters in wall module 51. A connection 68 between computer 65 and controller 67 may be a LON™, BACnet, or other type of bus. Controller 67 may be connected to module 51 and possibly to one or more other modules 71 or other types of devices such as sensors and actuators via a two wire polarity insensitive bus 69, or other type of bus or connection.

FIGS. 5-9 are diagrams of screen shots from the programming tool revealing how the tool may work. The present approach may allow a user to define labels in the programming tool for each value supported in an enumerated parameter.

Figure 5:
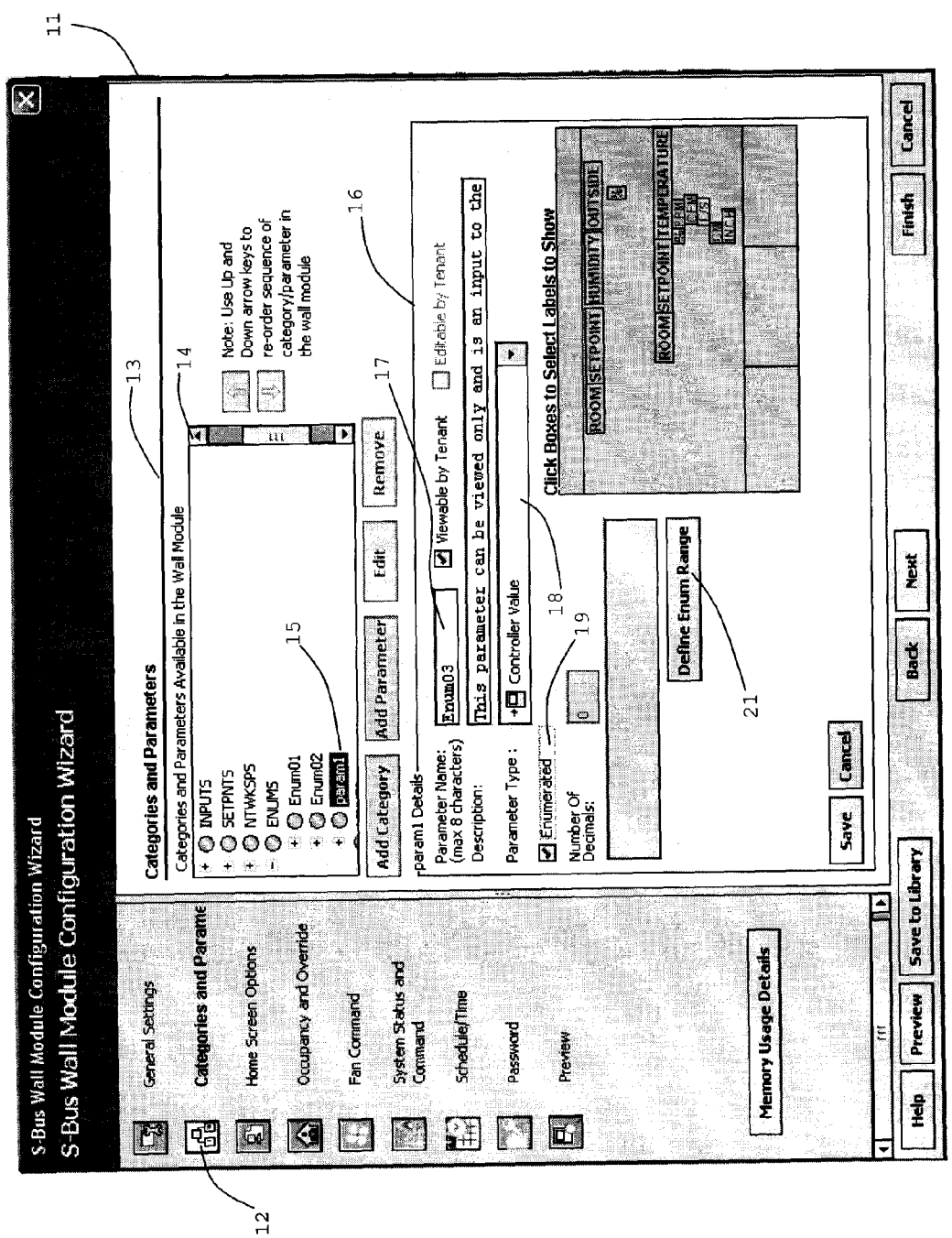
FIG. 5 is a diagram of a screen print of a bus wall module configuration tool.

FIG. 5 is a diagram of a screen print (screen) 11 of a bus wall module configuration wizard. In the left column, "Categories and Parameters" 12 may be selected resulting in a display 13. Area 14 may reveal the categories and parameters available in the wall module that is a subject of the configuration wizard. Categories may allow parameters to be organized by a user. Parameter 1 may be selected as indicated by a selection 15. Area 16 of screen print 11 may indicate parameter details.

A new parameter may be renamed to "Enum03 as entered in box 17. A parameter type "Controller Value" may be selected (although another type can also be selected) at box 18. An "Enumerated" box 19 may be checked.

A "Define Enum Range" button 21 may be clicked. Upon clicking button 21, a wall module Enum Library screen 22 may be shown in FIG. 6. A library entry in a box 37 may be labeled as "-New-". Screen 22, even though not shown as such, may be superimposed on screen 11. A user may enter ordinals in a box 23 above an "Add" button 24 and labels that represent the ordinals. The labels may be entered in a box 25 above a "Modify" button 26. The user may click Add button 24 to add the ordinal/label to a top list in area 27 of screen 22. Modify button 26 may be used to change an entry and a "Remove" button 28 to delete an entry.

A default value may be entered in a box 29. A default display may be entered in a box 31. The value in box 29 for the default display does not necessarily matter. The default display in box 31 may be used by the wall module if it receives a value from a controller that does not necessarily match any of the ordinals in the top list of area 27. The user may enter an "Enum Name" in a box 32. This entry may allow the top list of area 27 to be saved to a library for use on another parameter. A "Save" button 33 click may save the top list to the library. A "Select" button 34 click may select the top list for the present parameter. A click of a "Remove" button 35 may delete the top list from the library. A "Cancel" button 36 may return one to a previous state of screen 11 without anything having been done.

Figure 6:
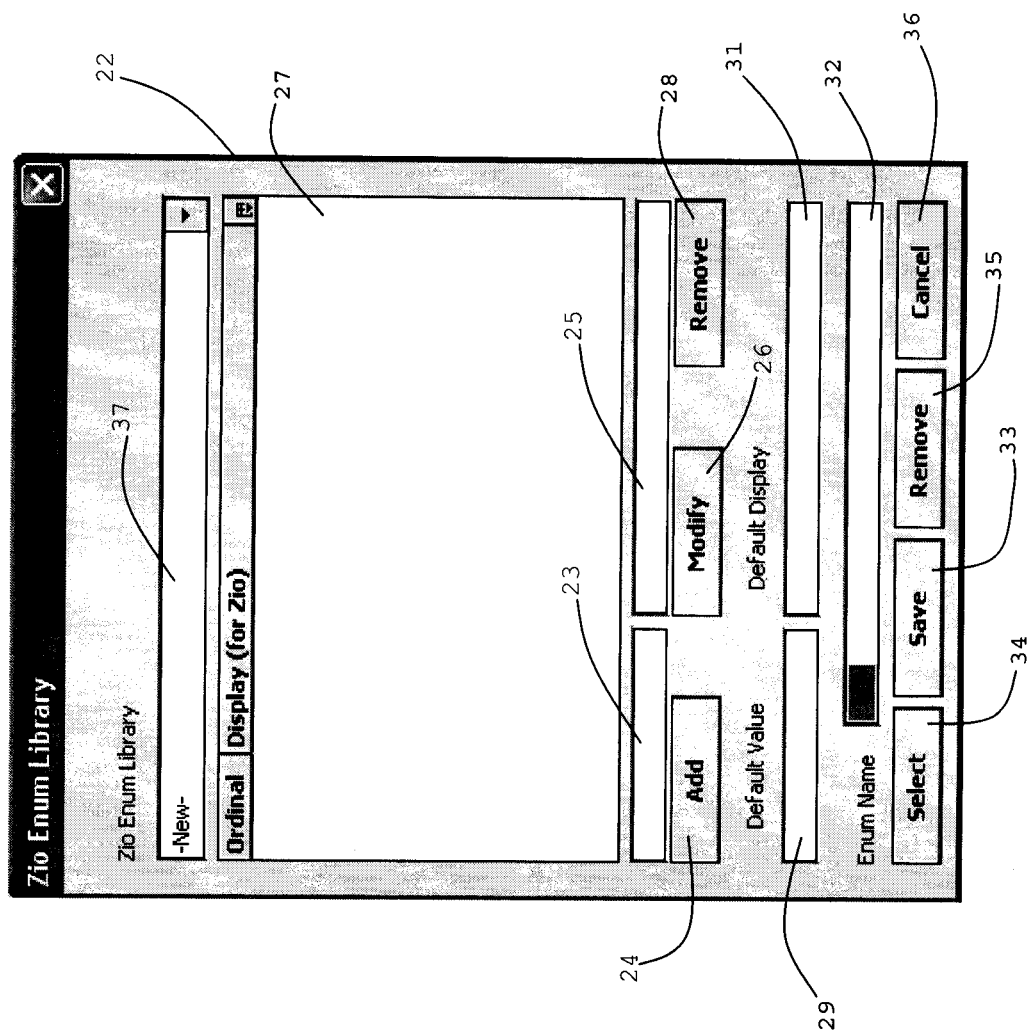
FIG. 6 is a diagram of a wall module enumeration library screen.
Figure 7:
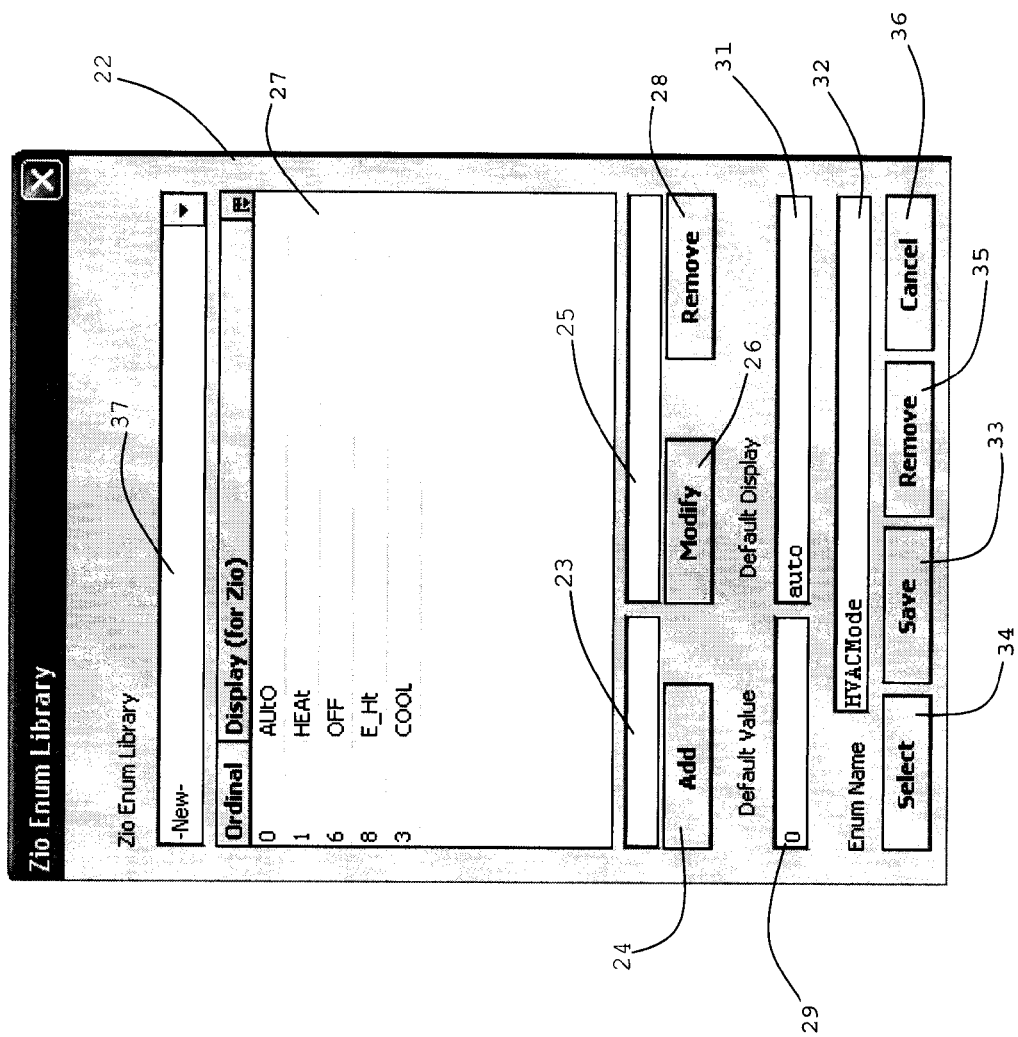
FIG. 7 is a diagram of a screen showing results of entries that may have been entered in the screen of FIG. 6.

FIG. 7 reveals screen 22 of results of entries that may have been entered in screen 22 of FIG. 6, without a click of button 35 or 36. Screen 22 is as it may look after entering the enumerations and naming them. Screen 22 shows the top list in area 27, the Enum Name of "HVACMode" in box 32, the Default Value of "0" in box 29, and "auto" in box 31.

Figure 8:
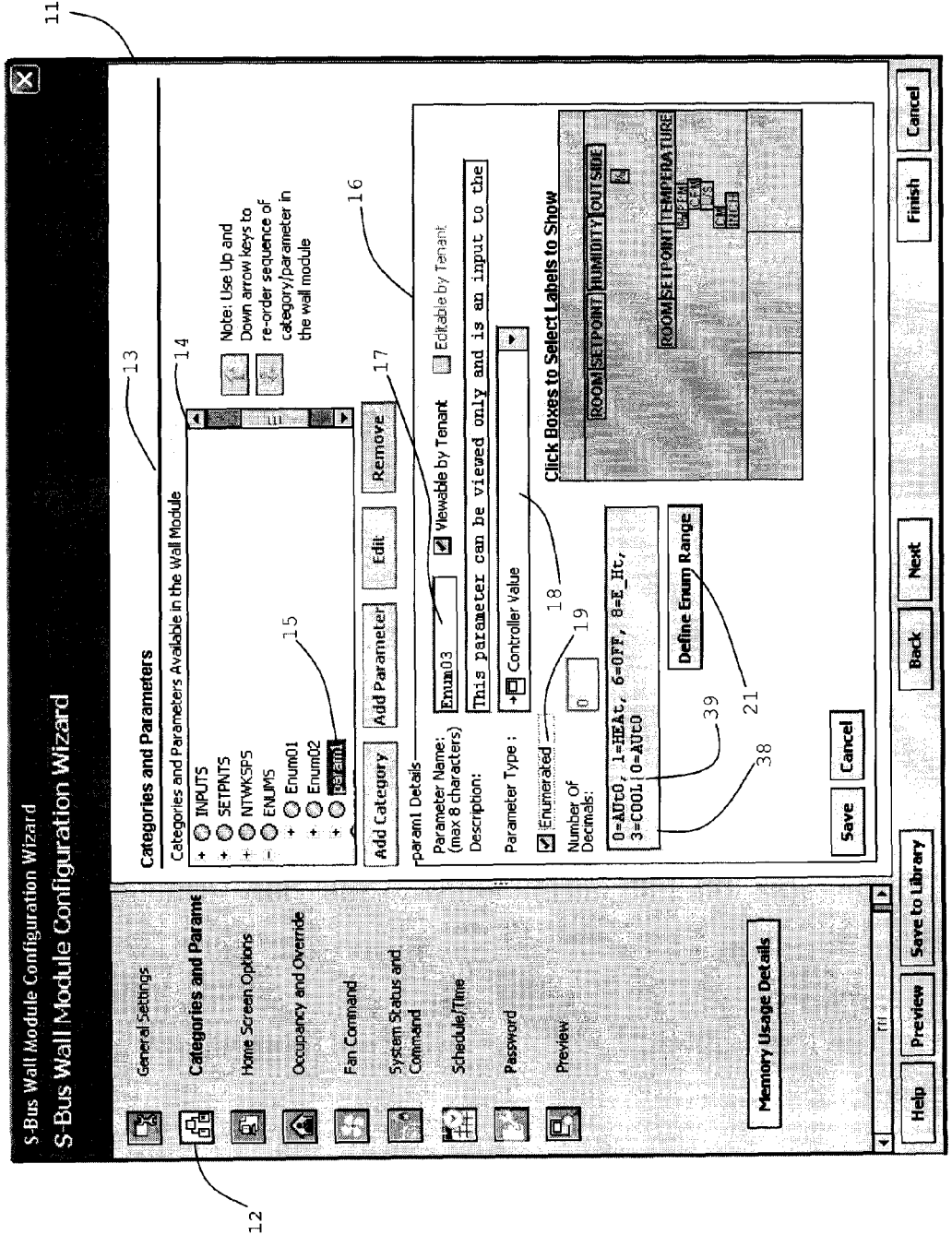
FIG. 8 is a diagram of a screen after a selection of an HVAC mode from the wall module enumeration (enum) library.

FIG. 8 is a diagram of screen 11 after a selection of the HVAC (viz., heating, ventilation and air conditioning) mode from the wall module Enum library. Box 38 shows the ordinals and labels for the enumerated parameter. The default value is "0=AUtO" that may be shown at the end of the ordinals and labels in box 38 after a pipe symbol 39 is present if the wall module receives a value from the controller that does not match an ordinal.

Figure 9:
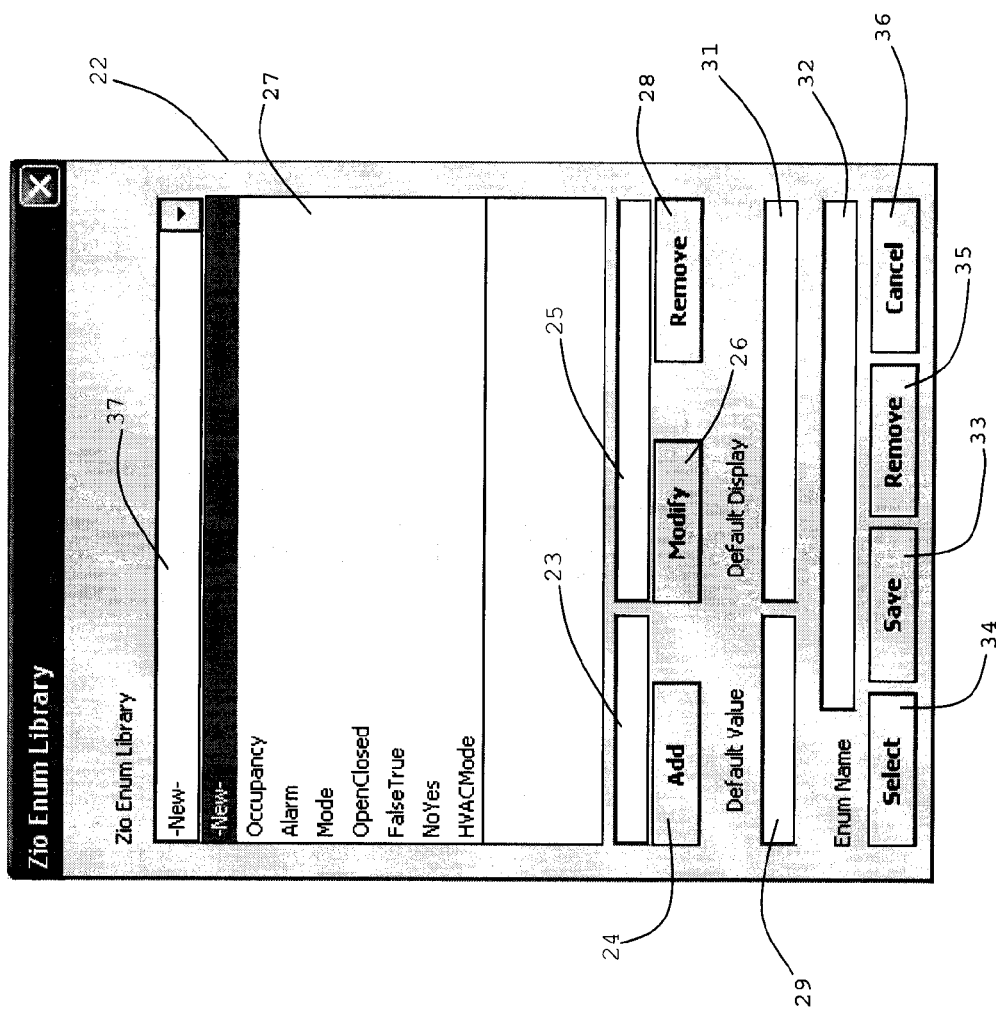
FIG. 9 is a diagram of a screen of the enumeration library may be populated with a number of choices in area such as, for example, occupancy, alarm, mode, and so forth.

In FIG. 9, screen 22 of the Enum library may be populated with a number of choices in area 27 such as, for example, Occupancy, Alarm, Mode, OpenClosed, FalseTrue, NoYes and HVACMode. The user may use any of these choices on another parameter or create a new choice.

Figure 10:
FIGS. 10 and 11 are diagrams of tables from a software interface specification that may describe how the wall module can use the enumeration label/number pairs created by a tool.
Figure 11:

FIGS. 10 and 11 are diagrams of tables 41 and 42, respectively, from a software interface specification that describes how the wall module may use the enumeration label/number pairs created by the tool. Each row of table 41 may be assigned to one or more parameters. Enumeration table 41 may store starting, ending and default enumeration indices for each parameter specified as an enumeration. The values in these columns are as follows. The number (42) to the left of the decimal point represents the table to examine. The number to the right of the decimal point refers to the row in table 42.

The columns of enumeration table 41 may be described as follows. The first column may be a row index for reference in this document. The second column may be a start enumeration index. The third column may be an end enumeration index. The fourth column may be a default label index. The fifth column may have a comment for reference in the document. Each index may be 1 byte with 0-254 as an index to enumeration label table 42. 255=Not allowed/for future use.

Figure 12:
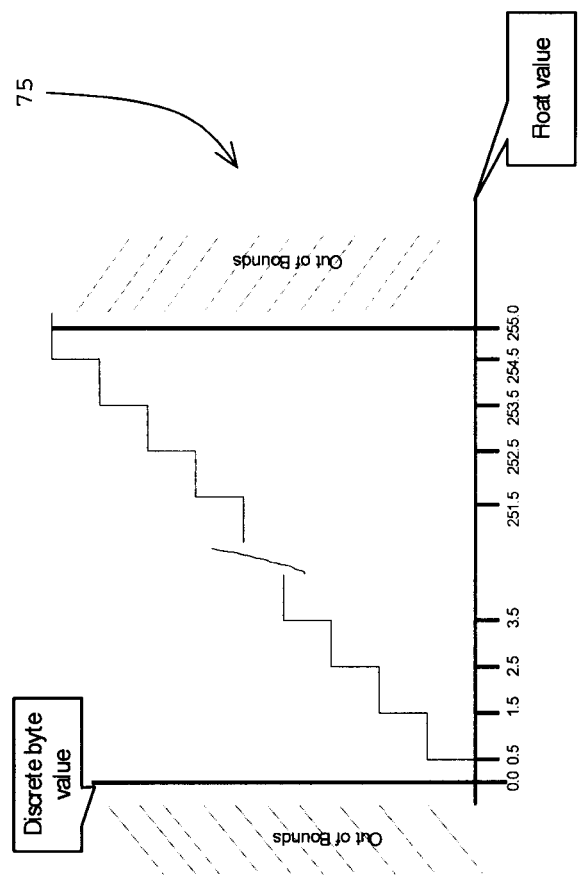
FIG. 12 is a diagram of a lookup table of discrete byte value versus a float value.

Some rules may incorporate the following. Table 41 may refer to table 42. The minimum size for table 41 may be 0 bytes. This may be a wall module without any enumerated values. The maximum number of enumeration entries may be limited to 255 (0-254) and by the size of the file in the wall module. It is not necessarily required that all enumeration values between the minimum (0) and the maximum (255) be listed. For example, enumerations for values 1, 4, 9, 27 and 255 may be in the table. It may be required that the tool order the enumeration values between the start and the end indices from lowest to highest value. This may allow the wall module to do a binary search on the set to find a label (FIG. 12). The parameter value may be compared to the enumeration values in table 42 between the start and end indices of table 41 inclusive using a binary search. If a match is found, the label associated with the enumeration may be shown. The floating point number may be compared against the hard bounds of 0.0<=VAL<=255.0. Anything outside of these bounds may be illegal and could cause the default enumeration label to be displayed. The floating point number may be rounded (not truncated) in such a way that if the tenths digit is 5 or greater, the number is rounded up (this matches what the wall module would do if it were being displayed as a number vs. an enumeration). The rounded number may be converted to an unsigned byte. Now the value may be compared to the table to find a matching label. If no match is found, then the default label may be displayed.

FIG. 12 is a diagram of a lookup table 75 of discrete byte value versus a float value. A binary search may begin in the middle of the graph so as to expedite finding a value.

For enumerations that are binary, text may be configured for 0 (FALSE) and 1 (TRUE). The start index may point to the 0 value and the end index may point to the 1 value. The tool may point the default label index to the TRUE value when the value is 2-255 to cover TRUE being non-zero.

The default label may be used if the parameter value does not match any value between the start and end indices of table 42. The enumeration value associated with this label does not necessarily matter as it was already determined that there was no match to the parameter value. Thus, the default label can be any label in table 42. It may be a label already used in some other enumeration range or a label not associated with a range.

If the default label is not in table 42 (i.e., the index is out of range or the table is empty), then the raw value (i.e., the unconverted floating point value) may be displayed. The wall module may prevent editing the raw value by showing "LOCKED".

Starting and ending indices may not necessarily be allowed to be 255 (0xFF). The starting index needs to be less than or equal to the end index.

An enumeration label table 42 may store the labels for virtually all of the enumeration values. Table 41 may reference this table. A column description of table 42 may be as in the following. The first column may be a row index for reference in this document. The second column may be enumeration value (1 byte). The enumeration value may be 0-255. The third column may be for a label (4 bytes). This approach may use 4 characters, but it can be extended to longer labels. It may extend to other approaches of storing a character such as multi-byte Unicode instead of 1 byte ASCII. This approach uses a one byte enumeration value, 0-255, but it can be extended to larger enumeration values. An ASCII label may be shown in a 7-segment area of the LCD for this value. The fourth column may be a comment for reference in the document.

Enumerated labels may be typically displayed, for example, in a 4 character by 7 segment area which is a middle area of the LCD to display text that represents a numeric value. Text that represents values may be called enumerated values. Because that area of the display may be 7 segments, the letters are limited to A, b, C/c, d, E, F, G, H, I/i, J, L, N/n, O/o, P, r, S, t, U/u, Y, Z, 0, 1, 2, 3, 4, 5, 6, 7, 8, 9, space and dash. K, M, Q, V, W, X, may not necessarily be displayable. As can be noted, just a lower case letter may be displayed such as for the letters b, d, r and t. Sometimes, there may be an option for displaying both upper and lower case such as relative to the letters C/c, I/i, N/n, O/o, or U/u. This approach may use a 7 segment display for the 4 characters, but it can be extended by using other display types that allow all letters, even those of other languages.

Conversion between large and small case may be handled automatically. That is, StBY, Stby, STBY, or stby may get converted to StbY by the wall module. It may be recommended that the tool not allow these letters to be used for enumerations so as not to confuse the user on why these characters show up in the top area but are spaces in the middle area.

Parameters shown on a home screen in the top left or top right are not necessarily limited to the middle area character set. Instead, the parameters may be limited to the top area character set. For example, if an enumeration label contains the letter "M", it may show as a blank in the middle area, and yet show as M in the top area.

The following may further describe the top left, top right and middle areas of the display. The present approach may use a display that is partitioned into multiple areas. Most notably two areas may be the 8 character 10 segment area and the 4 character 7 segment areas. One use for the 4 character area, also called the middle area, may be to display the value of a parameter. The value may be a number or an enumerated text label. The 8 character area may be used to display the label for the parameter. The 8 character area may also be split into two areas called the top left and top right areas. In this case, both the top left and/or the top right may display a parameter value (number or enumerated text label).

The home screen may display the enumeration label in the top left, top right and middle. It may be up to the user to program the home screen so that it makes sense. It may be possible to have the top left and right bleed into each other.

The tool should not necessarily allow duplicate enumeration values within the same start to end range.

The following may be wall module screens showing various enumerated parameters and values. The label/number pairs may be downloaded to the wall module as part of a definition of the parameter. If the value is not changeable by the user at the wall module, it may show the label associated with the value. If the value is changeable, the wall module may then present a list of labels to the user and then set the parameter to the value associated with the label selected by the user.

If two text strings are mapped to the same value, the wall module may display the first match. The tool user may need to provide an initial value for setpoints. The tool may also need to provide a default value for parameters that are displayed if a controller (e.g., Spyder™) sends a value not in the list.

The tool may have a text box where the user enters the list OFF=0; ON=1; AUTO=2; . . . and so forth. The user may separate each enumeration with a semi-colon (alternatively a comma or colon). The equal sign may associate the text string with the value. The tool type may check to insure that virtually all of the text characters are valid, that the text strings are 4 or less characters (spaces are allowed), and that there are no duplicate enumerations, and so forth. The tool may allow a string or group of strings to be saved and recalled from a library.

Typical enumerated values may include the following for: "True/False" where 0=FALS and Non zero=trUE; "On/Off" where 0=OFF and Non-zero=ON; "Occupancy" where 0=OCC, 1=UNOC, 2=bYP, 3=StbY and 255=NULL; "HVAC Mode" where 0=AUtO, 1=COOL, 2=HEAt, 3=E Ht and 255=OFF; "Alarm/No Alarm" where 0=NOAL and Non zero=ALAr; "Yes/No" where 0=NO and Non zero=YES; and "Open/Close" where 0=OPEN and Non zero=CLOS. Strings for "invalid" might be "----"=4 dashes, "        "=4 spaces and/or INUD=invalid (where a "U" is substituted for the "V").

Figure 13:
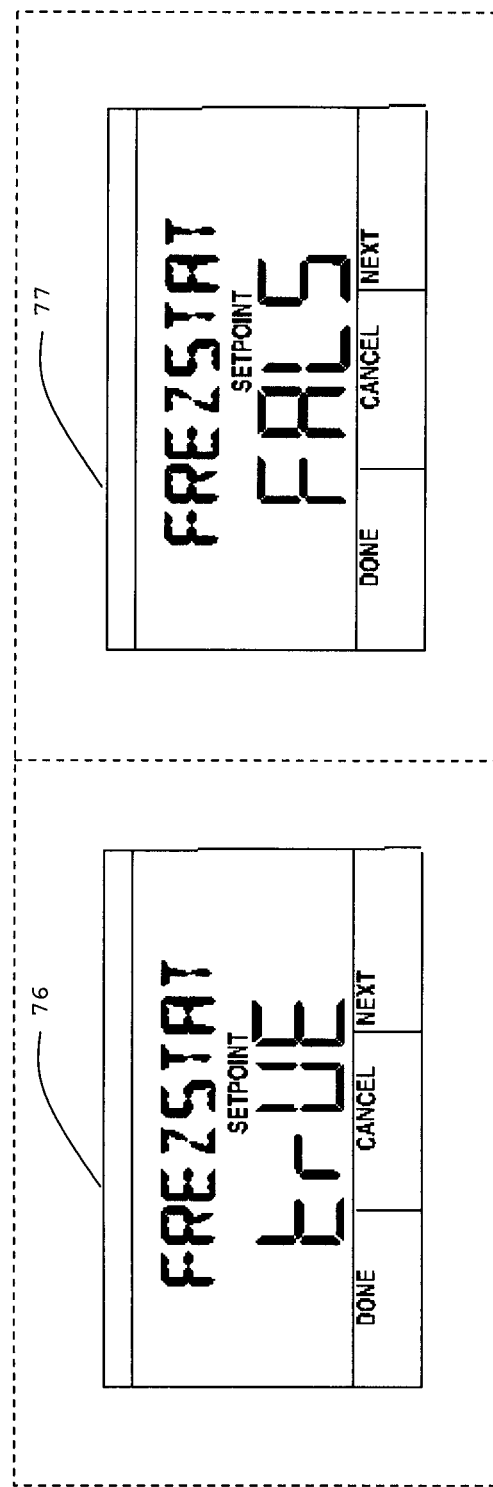
FIG. 13 is a diagram of a wall module display showing the enumeration labels for true and false of a parameter relating to a freeze condition.
Figure 14:
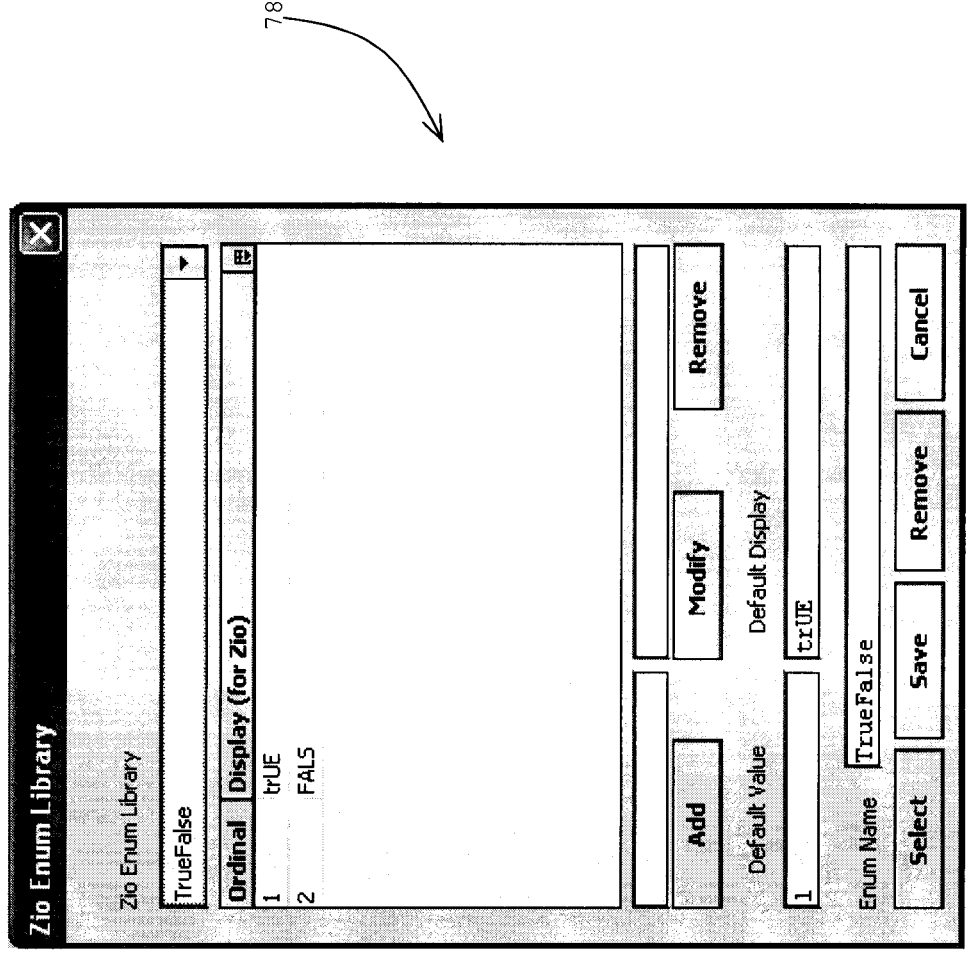
FIG. 14 is a diagram of a corresponding tool set up of the true/false enumeration in FIG. 13.

FIG. 13 is a diagram of a wall module display showing the enumeration labels for true and false of a parameter relating to a Freeze thermostat represented by the name "FREZSTAT" as indicated by screens 76 and 77, respectively. FIG. 14 is a diagram of a corresponding tool set up of the True/False enumeration, as indicated by screen 78.

Figure 15:
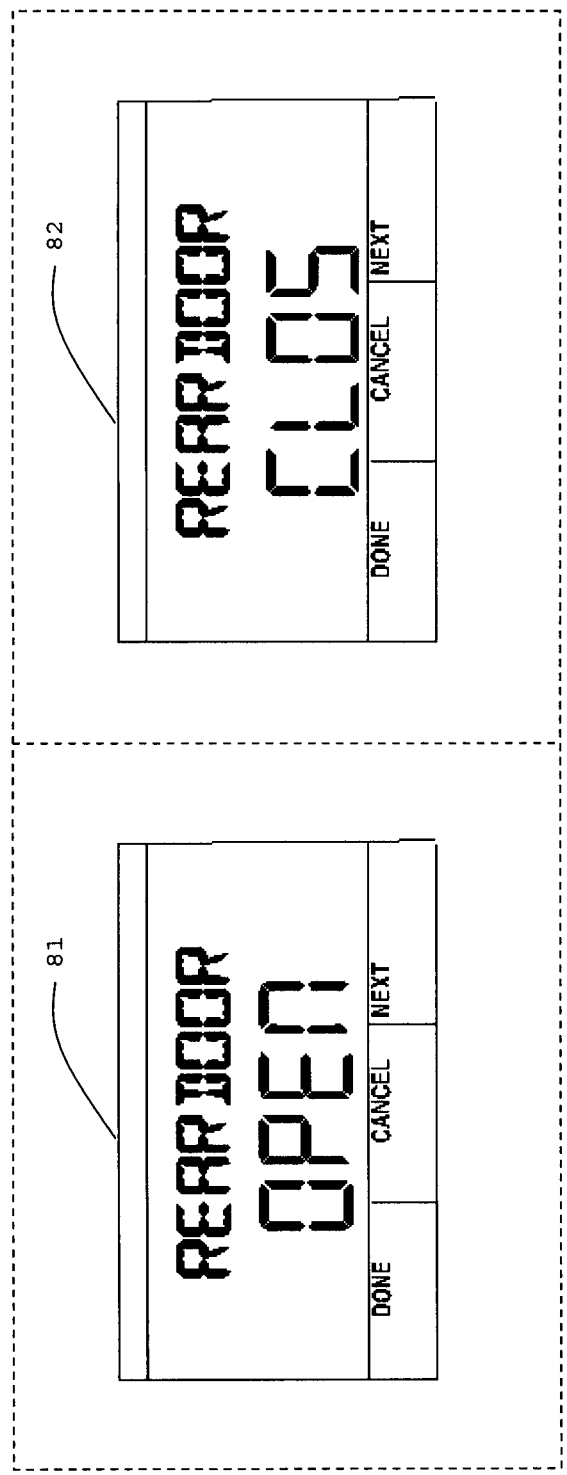
FIG. 15 is a diagram of example screens for a sensor at the rear door with open and closed indications.
Figure 16:
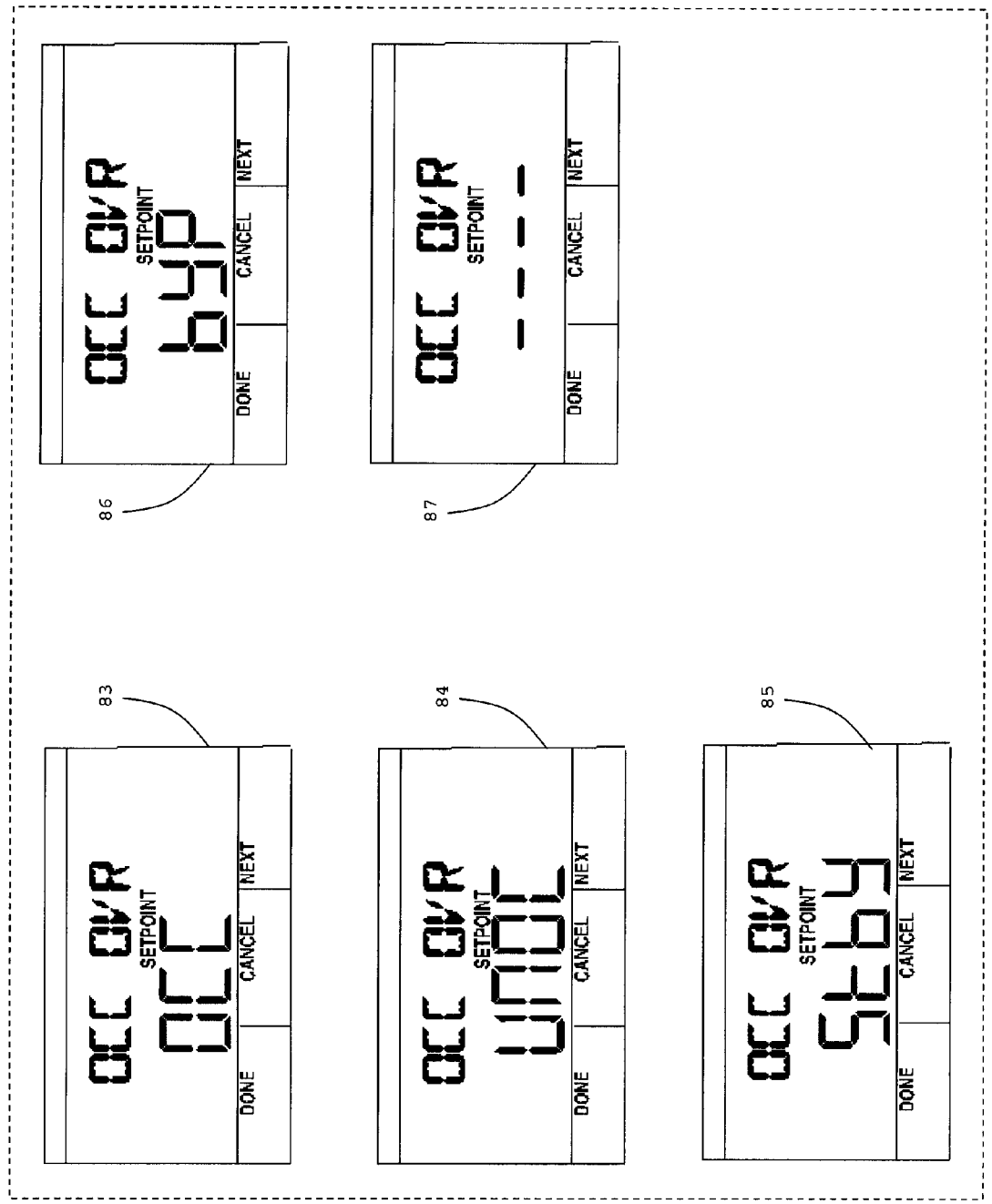
FIG. 16 is a diagram of example screens for manually setting an occupancy override for occupied, unoccupied, standby, bypass and null indications.

FIG. 15 is a diagram of example screens for a sensor on the rear door with open and closed indications, as indicated by screens 81 and 82, respectively. FIG. 16 is a diagram of example screens for manually setting an occupancy override for occupied, unoccupied, standby, bypass and null indications, as shown by screens 83, 84, 85, 86 and 87, respectively. The text enumeration for OCC_NULL may be 4 dashes or the user may configure it as NULL or some other label.

It is not necessary to restrict enumerations to text labels. Values may also be represented by graphic symbols. Graphic symbols may be used in place of text labels or in addition to them.

FIG. 17 is a diagram of an illustration 88 showing an example of a text label, graphic symbol or label, and number. The example may be for occupancy of a building for a screen on a wall module display. The text label, graphic symbol or label, and number may be "OCC", graphic symbol of a person in a house and a number "0", respectively, for an occupied indication. The text label, graphic symbol or label, and number may be "UNOCC", a graphic symbol of no person in a house and a number "1" for an unoccupied indication. The text label, graphic symbol or label, and number may be "STANDBY", "STANDBY" for the graphic symbol, and a number "3" for a standby indication. The graphic symbols noted may be for the USA. For Europe, for example, the substitute for the graphic symbol of a person in a house, the graphic symbol of no person in a house, and the graphic symbol of "STANDBY", may be a symbol of a sun, a quarter moon, and a half of a sun, respectively.

FIG. 18 is a diagram of another example of a text label, graphic symbol or label, and number for fan status of a building HVAC for a screen on a wall module display, as shown by illustration 89. The text label, graphic symbol or label, and number may be "OFF", a graphic symbol of a fan with the term "OFF" next to it, and a number "0", respectively, for an off indication. The text label, graphic symbol or label, and number may be "ON", a graphic symbol of a fan with the term "ON" next to it, and a number "1", respectively, for an on indication. The text label, graphic symbol or label, and number may be "AUTO", a graphic symbol of a fan with the term "AUTO" next to it, and a number "2", respectively, for an off indication. The text label, graphic symbol or label, and number may be "SPEED 1", a graphic symbol of a fan with one dark bar next to it, and a number "3" for a first speed indication. The text label, graphic symbol or label, and number may be "SPEED 2", a graphic symbol of a fan with two dark bars next to it, and a number "4" for a second speed indication. The text label, graphic symbol or label, and number may be "SPEED 3", a graphic symbol of a fan with three dark bars next to it, and a number "5" for a first speed indication.

To recap, a field configurable mechanism, for defining labels for enumeration values of parameters in a wall module, may incorporate a computer having a display, a controller connected to the computer, a wall module connected to the controller, and a wall module configuration tool situated in the computer.

The tool may provide a configuration screen for categories and parameters on the display. The tool may present a first area of the screen showing categories and parameters available in the wall module, and a second area of the screen for accessing details of a parameter. A name of the parameter may be enterable as one or more characters in a designated space in the second area of the screen. A button may be clickable to define an enumeration range, which results in a showing of an enumeration library screen. One or more ordinals and labels corresponding to the one or more ordinals, respectively, may be enterable in corresponding designated spaces in the enumeration library screen. Each ordinal and label pair may be addible to a top list in the enumeration library screen. An enumeration name may be enterable to allow the top list to be saved to a library for use on another parameter. A selection of the enumeration name from the library may result in the screen for parameters. The enumeration name may designate an enumerated parameter. A box in the screen for parameters may reveal the ordinals and labels for the enumerated parameter.

The box further may reveal a default value which is shown if the wall module receives an enumeration value that does not match an ordinal. The enumeration library screen may show a list of labels which can be used on the enumerated or another parameter. A default value and a default label may be enterable. The default label may be used by the wall module if the wall module receives a value that lacks a match with any ordinal in the top list. One or more text labels may be substitutable with one or more graphic symbols or labels, respectively. One or more graphic symbols or labels may be substitutable with one or more text labels, respectively.

One or more additional wall modules may be connected to the controller via a bus. A connection between the controller and the computer may be based on one of a group of protocols consisting of BACnet and LON™ Works. A connection between the controller and the wall module may be based on a bus also having one or more additional wall modules, actuators, sensors and the like.

An approach for providing labels for enumeration in a wall module, may incorporate entering a parameter name into a screen of a wall module configuration wizard, viewing an enumeration library screen upon entering the parameter name in the wizard, entering an ordinal number in the library screen, entering a label corresponding to the ordinal number, adding the ordinal number and the label to a list in the library screen, and saving the list to a library. The screens may be viewed on a display of a computer. Interfacing by a user with the screen may be effected with the computer.

The approach may further incorporate using a default value in absence of a match of an entered ordinal number with a label.

Each of one or more parameters may be reviewed on the display with a parameter name and an enumeration label. One or more enumeration labels may be text based. One or more enumeration labels may be graphic symbol based.

A user may define enumeration ordinals for one or more parameters. The user may define enumeration labels corresponding to the enumeration ordinals for one or more parameters.

One or more parameters may be reviewed on the display. The parameters may have numbers associated with them. The numbers may be replaced with labels for viewing the one or more parameters.

A system for defining labels, for enumeration in a wall module, may incorporate a wall module and a computer and/or controller connected to the wall module. The computer and/or controller may contain a wall module configuration wizard shown on a display of the computer. A parameter name may be entered into the wizard. An enumeration library screen may be brought up on the display. An ordinal number of the parameter may be entered in the library screen to result in a value and label corresponding to the ordinal number. The ordinal number and label may be added to a list in the library screen and saved in a library.

The wizard may incorporate an enumeration table and an enumeration label table. The parameter may be designated at the wall module that has a row in the enumeration table that indicates a start enumeration index and an end enumeration index. The start enumeration index may refer to a row of the enumeration label table that indicates an enumeration value and an enumeration label for the parameter. The end enumeration index may refer to a row of the enumeration label table that indicates an enumeration value and an enumeration label for the parameter. Any rows between the rows of the enumeration label table referred to by the start enumeration index and the end enumeration index may indicate enumeration values and enumeration labels for the parameter.

If a row in the enumeration table that indicates a start enumeration index refers to a row of the enumeration label table, an end enumeration index refers to a row of the enumeration label table and any rows between the rows of the enumeration label table referred to by the start enumeration index and the end enumeration index, and has no match in the enumeration label table for the parameter, then a row in the enumeration label table indicated by the default label index of the row for the parameter in the enumeration table, may contain a default enumeration label that indicates an absence of a value that matches the entered ordinal number.

The tables may allow reuse, compactness, labels on the display being enumerated, and/or a default label on the display if an entered ordinal number results without a matching value.

A row of the enumeration table may be reused by a different parameter. The rows of the enumeration table may be reused by the enumeration label table keeping a same start enumeration index and end enumeration index but a different default label index.

Generally, only ordinal number and label pairs associated with a selected parameter may be selected. One or more labels may be text based. One or more labels may graphic symbol based.

The system and approach for defining labels for enumeration values of parameters in a wall module may be a part of, integrated with and/or support a heating, ventilation and air conditioning (HVAC) system and approach.

The following patent documents might be relevant to the present approach. U.S. patent application Ser. No. 13/037,264, filed Feb. 28, 2011, and entitled "Method and Apparatus for Configuring Scheduling on a Wall Module", is hereby incorporated by reference. U.S. patent application Ser. No. 13/092,062, filed Apr. 21, 2011, and entitled "Automatic Application Wizard", is hereby incorporated by reference. U.S. patent application Ser. No. 13/415,765, filed Mar. 8, 2012, and entitled "Bus Extension Framework System", is hereby incorporated by reference.

In the present specification, some of the matter may be of a hypothetical or prophetic nature although stated in another manner or tense.

Although the present system and/or approach has been described with respect to at least one illustrative example, many variations and modifications will become apparent to those skilled in the art upon reading the specification. It is therefore the intention that the appended claims be interpreted as broadly as possible in view of the related art to include all such variations and modifications.

What is claimed is:

1. A field configurable mechanism for defining labels for enumeration values of parameters in a heating, ventilation and air conditioning wall module, comprising:
   a computer having a display;
   a controller connected to the computer;
   a heating, ventilation and air conditioning (HVAC) wall module connected to the controller; and
   a wall module configuration tool situated in the computer; and
   wherein:
   the tool provides a configuration screen for categories and parameters on the display;
   the tool presents a first area of the screen showing categories and parameters available in the HVAC wall module, and a second area of the screen for accessing details of a parameter;
   a name of the parameter is enterable as one or more characters in a designated space in the second area of the screen;
   a button is clickable to define an enumeration range, which results in a showing of an enumeration library screen;
   one or more ordinals and labels corresponding to the one or more ordinals, respectively, are enterable in corresponding designated spaces in the enumeration library screen;
   each ordinal and label pair is addible to a top list in the enumeration library screen;
   an enumeration name is enterable to allow the top list to be saved to a library for use on another parameter;
   a selection of the enumeration name from the library results in the screen for parameters;
   the enumeration name designates an enumerated parameter; and
   a box in the screen for parameters reveals the ordinals and labels for the enumerated parameter.

2. The mechanism of claim 1, wherein:
   a connection between the controller and the computer is based on one of a group of protocols consisting of BACnet and LON™ Works; and
   a connection between the controller and the wall module is based on a bus also having one or more additional wall modules, actuators, and/or sensors.

3. The mechanism of claim 1, wherein the box further reveals a default value which is shown if the wall module receives an enumeration value that does not match an ordinal.

4. The mechanism of claim 1, wherein the enumeration library screen shows a list of labels which can be used on the enumerated or another parameter.

5. The mechanism of claim 1, wherein:
   a default value and a default label are enterable; and
   the default label is used by the wall module if the wall module receives a value that lacks a match with any ordinal in the top list.

6. The mechanism of claim 1, wherein:
   one or more text labels are substitutable with one or more graphic symbols or labels, respectively; and
   one or more graphic symbols or labels are substitutable with one or more text labels, respectively.

7. The mechanism of claim 1, wherein one or more additional HVAC wall modules are connected to the controller via a bus.

8. A method for providing labels for enumeration in a heating, ventilation and air conditioning wall module, comprising:
   entering a parameter name into a screen of a heating, ventilation and air conditioning (HVAC) wall module configuration wizard;
   viewing an enumeration library screen upon entering the parameter name in the wizard;
   entering an ordinal number in the library screen;
   entering a label corresponding to the ordinal number;
   adding the ordinal number and the label to a list in the library screen; and
   saving the list to a library; and
   wherein:
   the screens are viewed on a display of a computer;
   interfacing by a user with the screen is effected with the computer; and
   the user defines enumeration ordinals for one or more parameters; and
   the user defines enumeration labels corresponding to the enumeration ordinals for one or more parameters.

9. The method of claim 8, further comprising using a default value in absence of a match of an entered ordinal number with a label.

10. The method of claim 8, wherein each of one or more parameters is reviewed on the display with a parameter name and an enumeration label.

11. The method of claim 10, wherein one or more enumeration labels are text based.

12. The method of claim 10, wherein one or more enumeration labels are graphic symbol based.

13. The method of claim 8, wherein:
   one or more parameters are reviewed on the display;
   the parameters have numbers associated with them; and
   the numbers are replaced with labels for viewing the one or more parameters.

14. A system for defining labels for enumeration in a wall module, comprising:
   a heating, ventilation and air conditioning (HVAC) wall module; and
   a computer and/or controller connected to the wall module; and
   wherein:
   the computer and/or controller contains a wall module configuration wizard shown on a display of the computer;
   a parameter name is entered into the wizard;
   an enumeration library screen is brought up on the display;
   an ordinal number of the parameter is entered in the library screen to result in a value and label corresponding to the ordinal number; and wherein the ordinal number and label are added to a list in the library screen and saved in a library.

15. The system of claim 14, wherein:
the wizard comprises an enumeration table and an enumeration label table;
the parameter is designated at the wall module that has a row in the enumeration table that indicates a start enumeration index and an end enumeration index;
the start enumeration index refers to a row of the enumeration label table that indicates an enumeration value and an enumeration label for the parameter;
the end enumeration index refers to a row of the enumeration label table that indicates an enumeration value and an enumeration label for the parameter; and
any rows between the rows of the enumeration label table referred to by the start enumeration index and the end enumeration index, indicate enumeration values and enumeration labels for the parameter.

16. The system of claim 15, wherein if a row in the enumeration table that indicates a start enumeration index refers to a row of the enumeration label table, an end enumeration index refers to a row of the enumeration label table and any rows between the rows of the enumeration label table referred to by the start enumeration index and the end enumeration index, and has no match in the enumeration label table for the parameter, then a row in the enumeration label table indicated by the default label index of the row for the parameter in the enumeration table, can contain a default enumeration label that indicates an absence of a value that matches the entered ordinal number.

17. The system of claim 15, wherein the tables allow reuse of the labels on the display and compactness of the labels on the display being enumerated, and/or a default label on the display if an entered ordinal number results without a matching value.

18. The system of claim 15, wherein:
a row of the enumeration table can be reused by a different parameter; and
the rows of the enumeration table can be reused by the enumeration label table keeping a same start enumeration index and end enumeration index but a different default label index.

19. The system of claim 15, wherein only ordinal number and label pairs associated with a selected parameter are selected.

20. The system of claim 14, wherein one or more labels are text based.

21. The system of claim 14, wherein one or more labels are graphic symbol based.

* * * * *